US009280795B2

(12) United States Patent
Faillaci, III et al.

(10) Patent No.: US 9,280,795 B2
(45) Date of Patent: Mar. 8, 2016

(54) DYNAMICALLY CREATING A SOCIAL NETWORKING CHECK-IN LOCATION

(71) Applicant: International Business Machines Corporation, Armonk, NY (US)

(72) Inventors: Anthony E. Faillaci, III, Austin, TX (US); Matthew C. Hillary, Tyler, TX (US); Jorge R. Nogueras, Austin, TX (US); Irina Tyshkevich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 13/628,080

(22) Filed: Sep. 27, 2012

(65) Prior Publication Data

US 2014/0089422 A1    Mar. 27, 2014

(51) Int. Cl.
| | |
|---|---|
| *G06F 15/16* | (2006.01) |
| *G06Q 50/00* | (2012.01) |
| *H04W 4/02* | (2009.01) |
| *H04W 4/08* | (2009.01) |
| *H04W 4/20* | (2009.01) |

(52) U.S. Cl.
CPC ............... *G06Q 50/01* (2013.01); *H04W 4/022* (2013.01); *H04W 4/08* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 2009/0215469 A1 | 8/2009 | Fisher et al. | |
| 2011/0004501 A1* | 1/2011 | Pradhan et al. | G06Q 50/01 |
| 2011/0106718 A1* | 5/2011 | Roberts et al. | G06Q 50/01 |
| 2011/0246063 A1* | 10/2011 | Nakamura | G01C 21/32 |
| 2011/0302270 A1* | 12/2011 | Kawabe et al. | H04L 12/1845 |
| 2012/0040653 A1 | 2/2012 | Mendis | |
| 2012/0047147 A1 | 2/2012 | Redstone et al. | |
| 2013/0091223 A1* | 4/2013 | DeLuca et al. | G06Q 10/10 |
| 2013/0262592 A1* | 10/2013 | DeLuca | G06Q 10/107 709/206 |

* cited by examiner

*Primary Examiner* — Chris Parry
*Assistant Examiner* — Soe M Hlaing
(74) *Attorney, Agent, or Firm* — Nicholas L. Cadmus

(57) ABSTRACT

In a method for creating a social networking check-in location for social networking applications, a computer receives a geographic location for each user computing device in a plurality of user computing devices. The computer determines a portion of the plurality of user computing devices that exhibit an area density exceeding a threshold. The area density is defined as a number of user computing devices per unit area. The computer receives two or more social networking messages from the portion of the plurality of user computing devices. The computer determines a common subject between the two or more social networking messages. The computer creates a social networking check-in location.

13 Claims, 3 Drawing Sheets

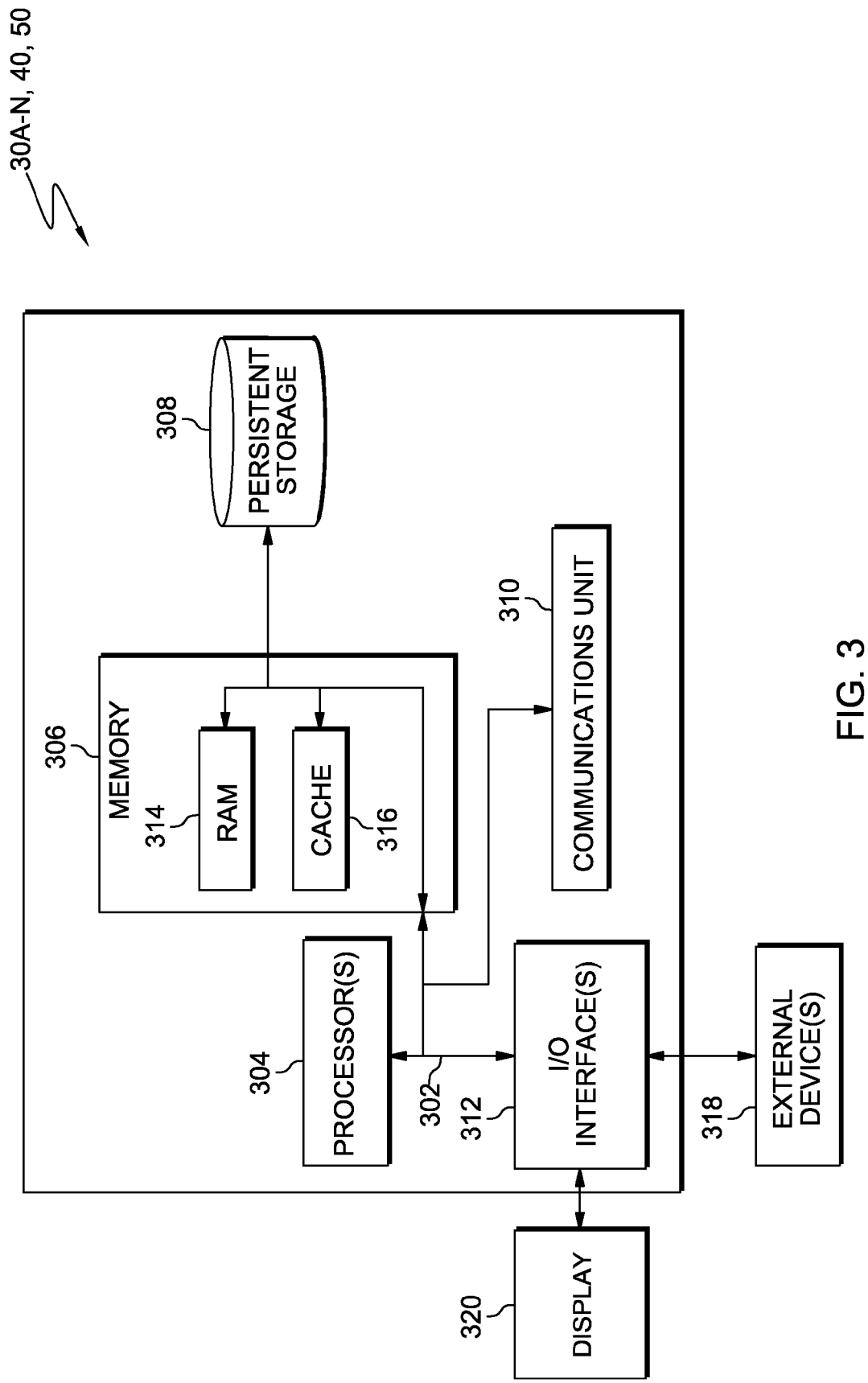

DYNAMICALLY CREATING A SOCIAL NETWORKING CHECK-IN LOCATION

TECHNICAL FIELD

The present invention relates generally to the field of social networking, and more specifically to a method, system, and computer program product for dynamically creating a social networking check-in location for social networking applications.

BACKGROUND

Social networking is the interaction between people to share information, ideas, resources and interests. A popular form of social networking uses social networking services over the Internet. A social networking service allows a person to become a "user," create a profile (description of the user) for the user's web page, communicate with other users, or utilize a range of other services available through the social network service. Examples of popular social networking services are Facebook® (Registered trademark of Facebook, Inc.), foursquare® (Registered trademark of Foursquare Labs, Inc.), and Twitter® (Registered trademark of Twitter, Inc.).

Users of social networking services communicate with other users of the service through "social networking messages," which are messages sent to the social networking service that can be made available to the general public, all users of the service, or to a select set of friends or followers. For example, a user of a social networking service, such as Facebook, can post a message or status update on his or her "Facebook wall." A "Facebook wall" is a user's virtual wall displayed when a user is logged in to the Facebook service. This wall is where a user can post messages for viewing by his or her friends, and where he or she can view messages posted by his or her friends on their walls. Users can also post messages directly on a friend's wall. In another example, a user of a social networking service, such as Twitter, can post a "Tweet®" message which is a message posted to a Twitter account. These Tweet messages can either be public or protected. A public Tweet message can be viewed by anyone while a protected Tweet message can only be seen by approved "followers." Followers are other users of Twitter social networking service that have subscribed to a user's Twitter updates.

Many social networking services, such as foursquare and Facebook allow users to "check in" to a specific location (check-in location) and share their location with others. For example, users can check in to a specific location by using a mobile social networking application on a smart phone or other computing device. Physical location of the smart phone or other device is typically determined using the Global Positioning System (GPS) capabilities of the smart phone or other computing device.

Many social networking applications have a feature where a user can see a list of nearby places into which the user can check in. If a location is not on the nearby places list, the user can add the location directly from the phone. Once a user has checked in, they have the option of sharing their location with friends in services such as foursquare or Facebook.

SUMMARY

Aspects of an embodiment of the present invention disclose a method and a program product for creating a social networking check-in location for social networking applications. A computer receives a geographic location for each user computing device in a plurality of user computing devices. The computer determines a portion of the plurality of user computing devices that exhibit an area density exceeding a threshold. The area density is defined as a number of user computing devices per unit area. The computer receives two or more social networking messages from the portion of the plurality of user computing devices. The computer determines a common subject between the two or more social networking messages. The computer creates a social networking check-in location.

BRIEF DESCRIPTION OF THE SEVERAL VIEWS OF THE DRAWINGS

FIG. 3 depicts a block diagram of components of the user computing devices, the social networking server, and the server of FIG. 1 in accordance with one embodiment of the present invention.

DETAILED DESCRIPTION

Figure 1:
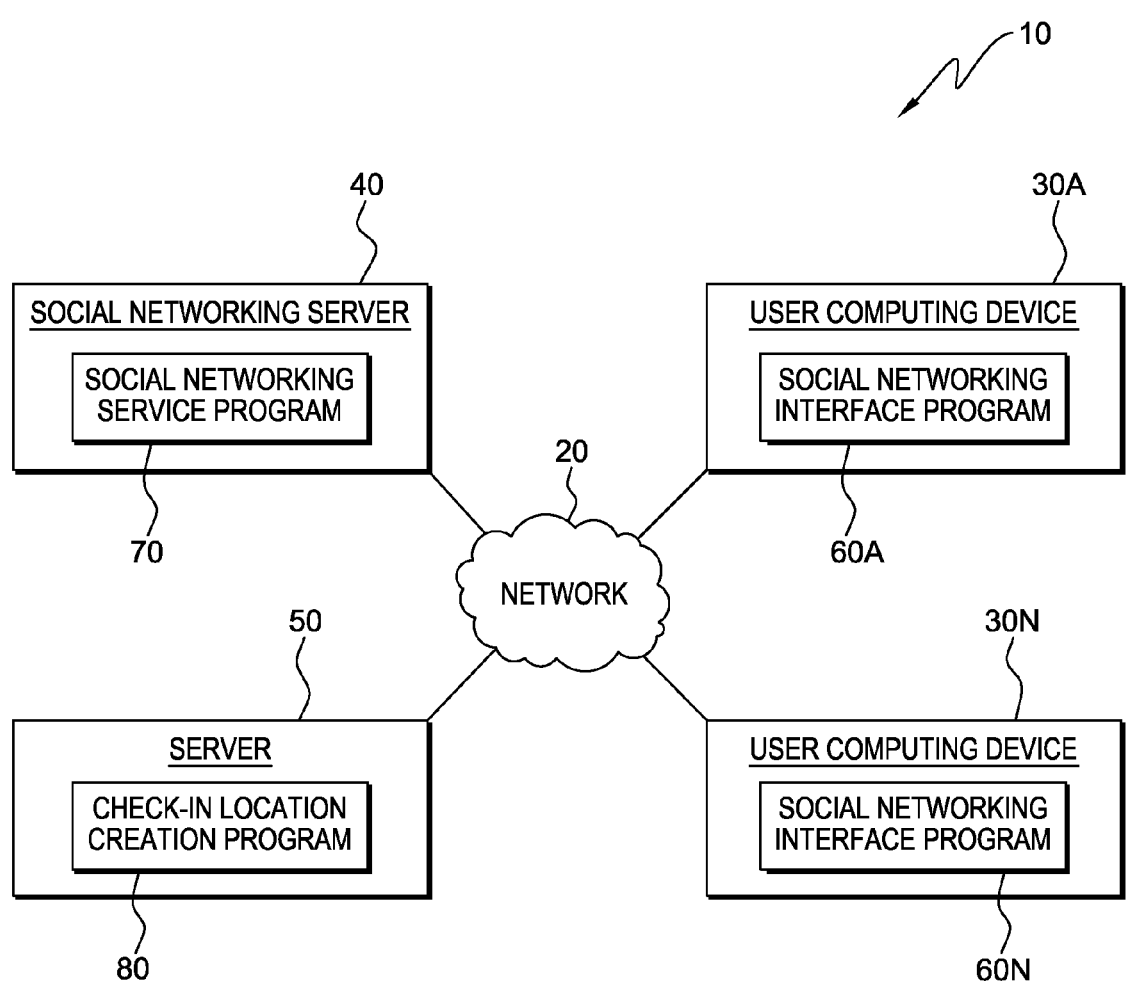
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes user computing devices 30A-N, social networking server 40, and server 50 interconnected over network 20. Network 20 may be a local area network (LAN), a wide area network (WAN) such as the Internet, a cellular data network, any combination thereof, or any combination of connections and protocols that will support communications between user computing devices 30A-N, social networking server 40, and server 50 in accordance with embodiments of the invention. Network 20 may include wired, wireless, or fiber optic connections. Computing system 10 may include additional user computing devices, servers, computers, or other devices not shown.

User computing devices 30A-N may be laptop computers, tablet computers, personal digital assistant (PDA), or smart phones. In general, user computing devices 30A-N may be any electronic device or computing system capable of sending and receiving data, and communicating with social networking server 40 over network 20.

In one embodiment, user computing devices 30A-N may each contain an application programming interface (API) (not shown). Location API's are application programming interfaces that programs can call to receive the geographic location of a user computing device. The location API receives the geographic location of a user computing device from a Global Positioning System (GPS) receiver (not shown). A GPS receiver is integrated or connected to each of user computing devices 30A-N. A GPS receiver can determine its geographic location and present that geographic location as longitude and latitude coordinates.

Social networking server 40 may be a server computer such as a management server, a web server, or any other electronic device capable of receiving and sending data. In another embodiment, social networking server 40 may represent a server computing system utilizing multiple computers as a server system, such as in a cloud computing environment. Social networking server 40 contains social networking service program 70.

Server 50 may be a server computer such as a management server, a web server, or any other electronic device capable of receiving and sending data. In another embodiment, server 50 may represent a server computing system utilizing multiple computers as a server system, such as in a cloud computing environment. Server 50 contains check-in location creation program 80.

Social networking interface programs 60A-N execute on user computing devices 30A-N, respectively. Social networking interface programs 60A-N may be dedicated social networking applications (e.g., a specific social networking service application on a smart phone), web browsers, or any other programs or functions that can communicate with social networking service program 70 and provide a user interface for creating social networking messages. In other embodiments, a social networking interface program may not be included on every user computing device present in computing system 10.

In one embodiment, social networking interface programs 60A-N have the capability to run in the background of their respective user computing device to constantly determine and make available the geographic location of that user computing device. For example, a user at user computing device 30A does not have to be actively using social networking interface program 60A for social networking interface program 60A to determine and make available the geographic location of user computing device 30A.

Social networking service program 70 operates to receive, forward, and manage social networking messages from social networking interface programs 60A-N. In one embodiment, social networking service program 70 is a main social networking program, such as Facebook social networking service or Twitter social networking service. In one embodiment, social networking service program 70 resides on social networking server 40. In other embodiments, social networking service program 70 may reside on another server or another computing device, provided that social networking service program 70 is accessible to social networking interface programs 60A-N, and provided that social networking service program 70 is accessible to check-in location creation program 80.

Check-in location creation program 80 operates to create a social networking check-in location for social networking applications. In one embodiment, check-in location creation program 80 determines that a subset of user computing devices exhibits an area density exceeding a threshold area density. Area density is defined as a number of user computing devices per unit area. Check-in location creation program 80 determines a common subject between social networking messages received from the subset of user computing devices. Check-in location creation program 80 creates a social networking check-in location based on the common subject.

In one embodiment, check-in location creation program 80 resides on server 50. In other embodiments, check-in location creation program 80 may reside on another server or another computing device, provided that check-in location creation program 80 has access to social networking service program 70.

User computing devices 30A-N, social networking server 40, and server 50 may each include components as depicted in further detail with respect to FIG. 3.

Figure 2:
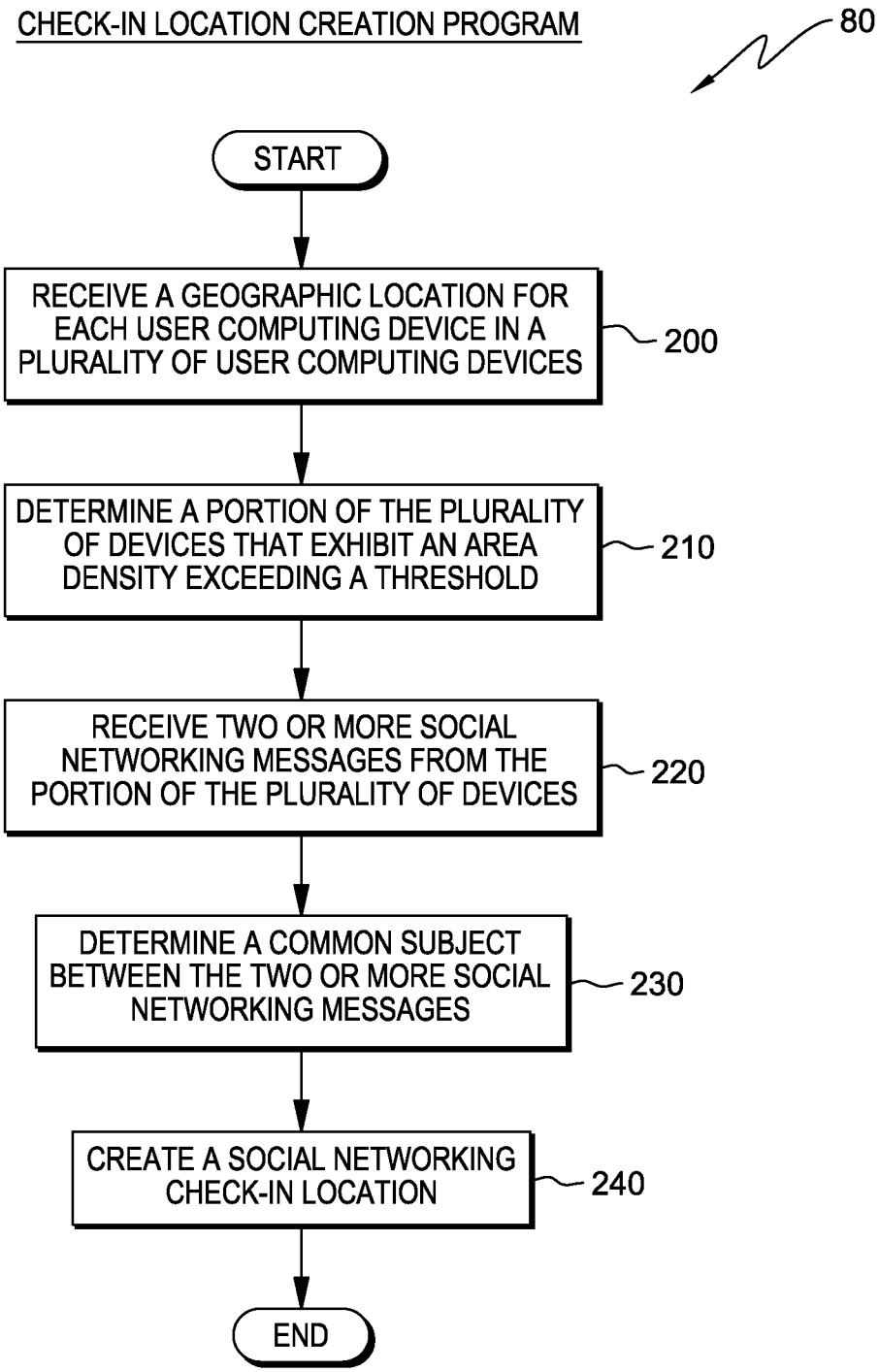
FIG. 2 depicts a flowchart of the steps of a check-in location creation program executing within the computing system of FIG. 1, for dynamically creating a social networking check-in location, in accordance with one embodiment of the present invention.

FIG. 2 depicts a flowchart of the steps of check-in location creation program 80 executing within computing system 10 of FIG. 1, for dynamically creating a social networking check-in location, in accordance with one embodiment of the present invention.

Initially, the geographic locations of user computing devices 30A-N are determined and sent to check-in location creation program 80.

In one embodiment, social networking interface program 60A calls the location API of user computing device 30A for the geographic location of user computing device 30A. The location API receives the location of user computing device 30A from a GPS receiver integrated with user computing device 30A. A GPS receiver can determine its location and present that location as longitude and latitude coordinates. Social networking interface program 60A sends the geographic location to social networking service program 70 over network 20. In other embodiments, social networking interface program 60A sends the geographic location directly to check-in location creation program 80 over network 20. Social networking interface programs 60A-N each function similarly.

In another embodiment, the geographic location of user computing device 30A may be determined by a carrier and sent to check-in location creation program 80. A carrier may be a cellular telephone carrier if the user computing device is a cellular telephone. Cellular networks can determine the geographic location of a cellular telephone by using the radio resource location services protocol. Radio resource location services protocol supports the positioning method, Enhanced Observed Time Difference (E-OTD). E-OTD is based on measurements inside the cellular telephone, where the phone measures the observed time difference of arrival of bursts sent by nearby pairs of base transceiver stations.

In step 200, check-in location creation program 80 receives the geographic locations of user computing devices 30A-N. In one embodiment, check-in location creation program 80 receives the geographic locations of user computer devices 30A-N from social networking interface programs 60A-N, respectively. In one embodiment, a geographic location is presented as longitude and latitude coordinates.

In step 210, check-in location creation program 80 determines that a subset of the user computing devices of user computing devices 30A-N exhibits an area density exceeding a threshold area density. In one embodiment, check-in location creation program 80 uses a commercially available or open source statistical analysis program to determine that the subset of the user computing devices of user computing devices 30A-N exhibits an area density exceeding a threshold area density.

The statistical analysis program, for example, may run a histogram function on the geographic locations of user computing devices 30A-N. A histogram function is a mathematical function that counts the number of observations that fall into separate bins. In one embodiment, the geographic locations (e.g., longitude and latitude coordinates) of user computing devices 30A-N are the observations, and separate areas on the earth's surface (e.g., the area between two lines of latitude and two lines of longitude) are the bins. The histogram function determines if a subset of the user computing devices in user computing devices 30A-N exists in each area on the earth's surface. This determination represents the area density of each subset of user computing devices in user computing devices 30A-N. The statistical analysis function determines that a subset of the user computing devices in user computing devices 30A-N exhibits an area density exceeding a threshold area density.

If check-in location creation program 80 is deployed to create social networking check-in locations in Manhattan a different bin size may be appropriate compared with other locations. For example, a smaller bin size may be used to account for smaller venues on average in Manhattan. Different threshold area densities may also be appropriate depending on the locations. Bin size and threshold area density may be predetermined. A larger threshold area density may be used to account for the larger probability that more user computing devices may be in the same area because of the larger population density in Manhattan.

In step 220, check-in location creation program 80 receives two or more social networking messages from the subset of the user computing devices of user computing devices 30A-N that exhibits an area density exceeding a threshold area density. In one embodiment, check-in location creation program 80 sends a notification to social networking service program 70 indicating the subset of the user computing devices of user computing devices 30A-N that exhibits an area density exceeding a threshold area density. The notification directs social networking service program 70 to send social networking messages from the subset of the user computing devices of user computing devices 30A-N that exhibits an area density exceeding a threshold area density to check-in location creation program 80.

In one embodiment, two or more users at respective user computing devices in the subset of the user computing devices in user computing devices 30A-N input a social networking message using a respective social networking interface program from social networking interface programs 60A-N. The social networking messages are sent to social networking service program 70 over network 20. Social networking service program 70 sends the two or more social networking messages from the subset of the user computing devices of user computing devices 30A-N that exhibits an area density exceeding a threshold area density to check-in location creation program 80 over network 20.

In step 230, check-in location creation program 80 determines a common subject between the two or more social networking messages from the subset of the user computing devices of user computing devices 30A-N that exhibits an area density exceeding a threshold area density.

In one embodiment, check-in location creation program 80 determines a common subject between the two or more social networking messages by a statistical comparison of words appearing in each of the social networking messages. The statistical comparison is done by a text analytics program. The statistical comparison identifies keywords that appear in a threshold percentage of social networking messages from the subset of the user computing devices of user computing devices 30A-N that exhibits an area density exceeding a threshold area density. The threshold percentage, for example, may be 50%. The keyword would have to appear in at least 50% of the social networking messages to be considered the common subject.

A keyword is a word which occurs in a text more often than would be expected by chance. Keywords are calculated by carrying out a statistical test (e.g., log linear) which compares the word frequencies in a text against their expected frequencies derived in a much larger corpus, which acts as a reference for general language use. A keyword may also be identified by a hashtag (e.g., "#concert" on Twitter™), or some other tag placed on a word.

In another embodiment, check-in location creation program 80 uses a concept mining program to determine a common subject between the two or more social networking messages. Concept mining is a process that extracts concepts found in text. The concept mining process includes the ability to scan multiple messages and relate them on the basis of a common concept.

In step 240, check-in location creation program 80 creates a social networking check-in location based on the common subject between the two or more social networking messages from the subset of the user computing devices in user computing devices 30A-N that exhibits an area density exceeding a threshold area density. In one embodiment, the check-in location is given a title derived from the common subject determined in step 230. The title may be just the common subject determined in step 230. The location of the check-in location is the area on the earth's surface where the subset of the user computing devices in user computing devices 30A-N exists. Check-in location creation program 80 sends information describing the check-in location (e.g., the title and location) to social networking service program 70. In one embodiment, social networking service program 70 will update the check-in location database used for the check-in feature of the social networking service.

FIG. 3 depicts a block diagram of components of user computing devices 30A-N, social networking server 40, and server 50 in accordance with one embodiment of the present invention. It should be appreciated that FIG. 3 provides only an illustration of one implementation and does not imply any limitations with regard to the environments in which different embodiments may be implemented. Many modifications to the depicted environment may be made.

User computing devices 30A-N, social networking server 40, and server 50 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In one embodiment, memory 306 includes random access memory (RAM) 314 and cache memory 316. In general, memory 306 can include any suitable volatile or non-volatile computer-readable storage media.

Social networking interface programs 60A-N are stored in persistent storage 308 of user computing devices 30A-N, respectively. Social networking interface programs 60A-N are stored for execution by one or more of the respective computer processors 304 of user computing devices 30A-N via one or more memories of memory 306 of user computing devices 30A-N, respectively. Social networking service program 70 is stored in persistent storage 308 of social networking server 40 for execution by one or more of the respective computer processors 304 of social networking server 40 via one or more memories of memory 306 of social networking server 40. Check-in location creation program 80 is stored in persistent storage 308 of server 50 for execution by one or more of the respective computer processors 304 of server 50 via one or more memories of memory 306 of server 50. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Social networking interface programs 60A-N may be downloaded to persistent storage 308 of user computing devices 30A-N through communications unit 310 of user computing devices 30A-N, respectively. Social networking service program 70 may be downloaded to persistent storage 308 of social networking server 40 through communication unit 310 of social networking server 40. Check-in location creation program 80 may be downloaded to persistent storage 308 of server 50 through communications unit 310 of server 50.

I/O interface(s) 312 allows for input and output of data with other devices that may be connected to computing system 10. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor or a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating a social networking check-in location for social networking applications, the method comprising the steps of:
    a computer receiving a geographic location for each user computing device in a plurality of user computing devices;
    the computer determining a portion of the plurality of user computing devices that exhibit an area density exceeding a threshold area density, wherein the area density is defined as a number of user computing devices per unit area;
    the computer receiving two or more social networking messages from the portion of the plurality of user computing devices that exhibit an area density exceeding the threshold area density; and
    the computer creating a social networking check-in location based on a common subject determined from the two or more social networking messages from the portion of the plurality of user computing devices that exhibit an area density exceeding the threshold area density.

2. The method of claim 1, wherein geographic location is expressed as longitude and latitude coordinates determined by a global positioning system.

3. The method of claim 1, wherein the unit area comprises an area on the earth's surface between two lines of latitude and two lines of longitude.

4. The method of claim 1, wherein the step of the computer determining a portion of the plurality of user computing devices that exhibit an area density exceeding a threshold comprises:
    the computer determining an area density of a portion of the plurality of user computing devices; and
    the computer determining that the area density of the portion of the plurality of user computing devices exceeds a threshold.

5. The method of claim 1, wherein a social networking message is a message sent between users of a social networking service.

6. A computer program product for creating a social networking check-in location for social networking applications, the computer program product comprising:
    one or more computer-readable storage devices and program instructions stored on the one or more computer-readable storage devices, the program instructions comprising:
    program instructions to receive a geographic location for each user computing device in a plurality of user computing devices;
    program instructions to determine a portion of the plurality of user computing devices that exhibit an area density exceeding a threshold area density, wherein the area density is defined as a number of user computing devices per unit area;
    program instructions to receive two or more social networking messages from the portion of the plurality of user computing devices that exhibit an area density exceeding the threshold area density; and
    program instructions to create a social networking check-in location based on a common subject determined from the two or more social networking messages from the portion of the plurality of user computing devices that exhibit an area density exceeding the threshold area density.

7. The computer program product of claim 6, wherein geographic location is expressed as longitude and latitude coordinates determined by a global positioning system.

8. The computer program product of claim 6, wherein the unit area comprises an area on the earth's surface between two lines of latitude and two lines of longitude.

9. The computer program product of claim 6, wherein the program instructions to determine a portion of the plurality of user computing devices that exhibit an area density exceeding a threshold comprise:
    program instructions to determine an area density of a portion of the plurality of user computing devices; and
    program instructions to determine that the area density of the portion of the plurality of user computing devices exceeds a threshold.

10. A computer system for creating a social networking check-in location for social networking applications, the computer system comprising:
    one or more computer processors; one or more computer-readable storage media; program instructions stored on the computer-readable storage media for execution by at least one of the one or more processors, the program instructions comprising:
    program instructions to receive a geographic location for each user computing device in a plurality of user computing devices;
    program instructions to determine a portion of the plurality of user computing devices that exhibit an area density exceeding a threshold area density, wherein the area density is defined as a number of user computing devices per unit area;
    program instructions to receive two or more social networking messages from the portion of the plurality of user computing devices that exhibit an area density exceeding the threshold area density; and
    program instructions to create a social networking check-in location based on a common subject determined from the two or more social networking messages from the portion of the plurality of user computing devices that exhibit an area density exceeding the threshold area density.

11. The computer system of claim 10, wherein geographic location is expressed as longitude and latitude coordinates determined by a global positioning system.

12. The computer system of claim 10, wherein the unit area comprises an area on the earth's surface between two lines of latitude and two lines of longitude.

13. The computer system of claim 10, wherein the program instructions to determine a portion of the plurality of user computing devices that exhibit an area density exceeding a threshold comprise:
   program instructions to determine an area density of a portion of the plurality of user computing devices; and
   program instructions to determine that the area density of the portion of the plurality of user computing devices exceeds a threshold.

* * * * *